T 864015

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1405

724,222

INORGANIC FIBERS CONTAINING POSITIVELY CHARGED SILICA AND FIBROUS POTASSIUM TITANATE

Robert Oliver Bayer, 1413 Emory Road, Green Acres, Wilmington, Del. 19803

Filed Apr. 25, 1968. Published July 29, 1969
Int. Cl. D21h *5/18*
U.S. Cl. 162—152
No Drawing. 14 Pages Specification

A heat-resistant inorganic composition has been prepared which comprises (1) about 20 to 97 parts by weight of inorganic fibers such as those of alumino silicate, mineral wool, etc., and (2) about 80 to 3 parts by weight of positively-charged silica and pigmentary potassium titanate in a weight ratio of potassium titanate to positively charged silica of 1:2 to 7:1. The pigmentary potassium titanate has an average diameter of 0.2 micron and an average length of 8 to 10 microns. The production process comprises first forming a slurry of the inorganic fibers and positively-charged silica and then adding the pigmentary potassium titanate. After addition of the potassium titanate, the pH is preferably adjusted to 5 to 6 and the desired shape can be formed and dried.